J. L. MARTIN.
Ageing Liquors.
No. 64,990.
Patented May 21, 1867.
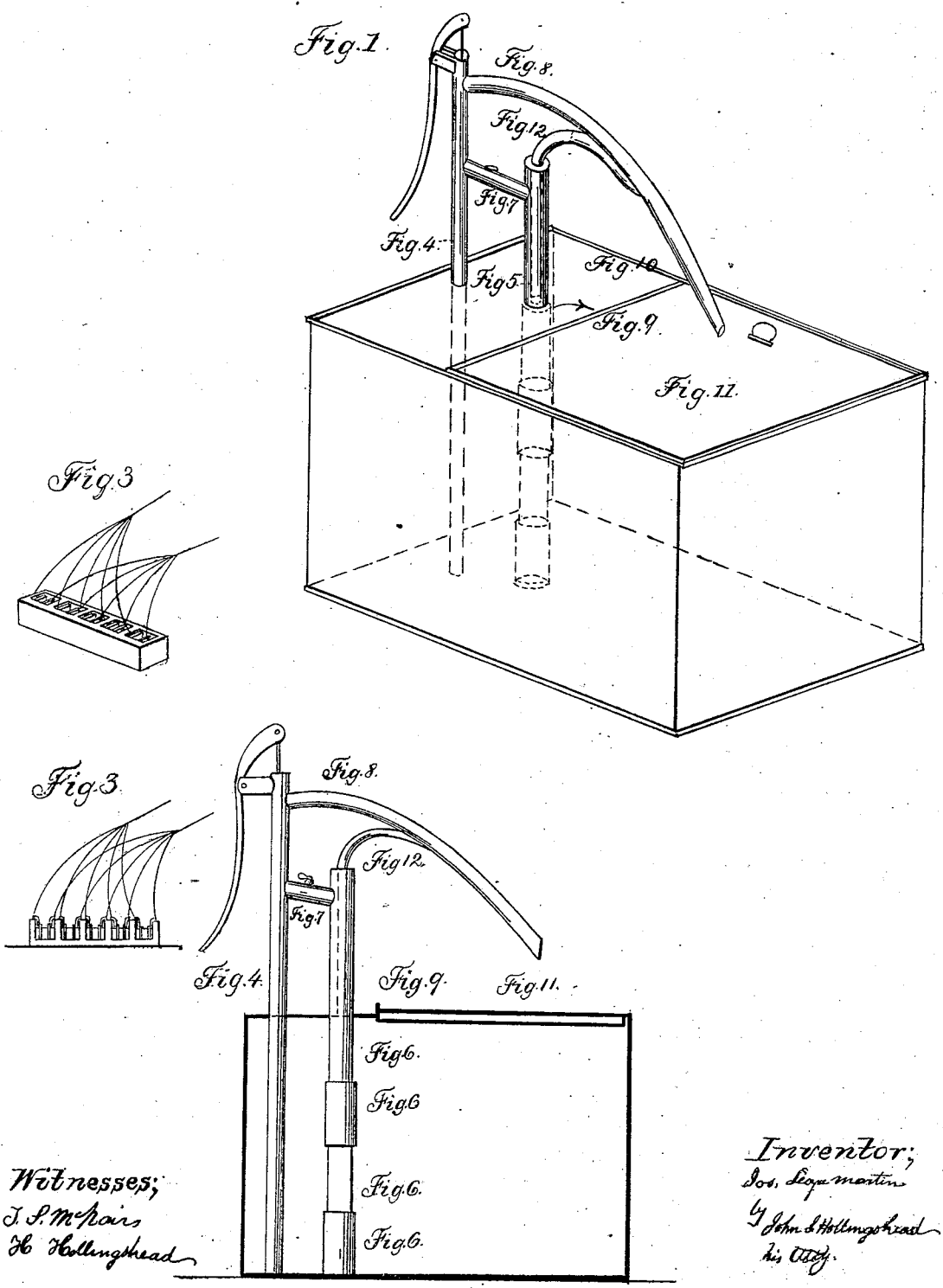

United States Patent Office.

JOSEPH LLOYD MARTIN, OF BALTIMORE, MARYLAND.

Letters Patent No. 64,990, dated May 21, 1867.

---

IMPROVED MODE OF AGEING ALCOHOLIC LIQUORS.

---

The Schedule referred to in these Letters Patent and making part of the same.

---

TO ALL WHOM IT MAY CONCERN:

Be it known that I, JOSEPH LLOYD MARTIN, of the city of Baltimore, and State of Maryland, have invented a new and useful method or process for changing, altering, or modifying fresh or recently-distilled whiskey, brandy, gin, or any and all other alcoholic liquors, so as to render them essentially the same as if they had lain in casks for years, and thus become modified by age. This change, alteration, or modification I accomplish by means of the imponderable agents, heat, electricity, and attrition, either separately applied or in combination; and in order that others skilled may be able to apply and use my method or process, I give the following description of the construction of the apparatus necessary for and the operation of the same, reference being had to the annexed drawings, making a part of this specification, in which—

Figure 1 is a perspective view of a copper tank or cistern, of the proper dimensions, into which the recently-distilled liquor is emptied for operation.

Figure 2 is a view of a section of the same.

Figure 3 represents a galvanic battery, of ordinary form, sufficient for the purpose.

Figure 4 represents a pump, by means of which the liquor is pumped out of and again returned to the tank.

Figure 5 represents a copper re-supply pipe, of proper dimensions, leading to the gauze-wire sieves within the tank.

Figure 6 represents a series of gauze-wire sieves securely attached upon and to each other.

Figure 7 represents a pipe and stop-cock, by which the pump and re-supply pipes are connected.

Figure 8 represents a condensing pipe, also connected to the re-supply pipe and pump.

Figure 9 represents a copper perforated plate inserted in the re-supply pipe at its entrance into the tank.

Figure 10 represents a safety-valve through which the tank is filled.

Figure 11 represents an opening through which an insulated wire from the battery is passed into the liquid.

Figure 12 represents an escape pipe, leading from within the tank through the re-supply pipe to the condensing pipe, fig. 8.

The mode of operating is as follows: The tank is filled with the liquor through the opening, fig. 10, and the pump, which should be equal in dimensions or capacity to the re-supply pipe, is set in motion and the liquor raised to the pipe, fig. 7, through which it passes into the re-supply pipe, fig. 5, falling down upon the perforated plate, fig. 9, with heavy pressure, through the perforations, which latter should be small enough to partially resist the passage of the liquid through them, so that the re-supply pipe will remain full by the working of the pump. The liquid passes through the perforations in the plate to the first gauze-wire sieve, fig. 6, through which it passes to the second, and through it to the third, and so on throughout the whole series of wire-work, returning again into the tank, care being taken that the liquor shall be returned by the pump to the tank only through the sieves. Whilst the liquor is in the tank, it is receiving a steady current of electricity from the battery, fig. 3, one pole of which passes, insulated, through the opening in the tank, fig. 11, and is immersed in the liquor, the other pole of the battery being placed in metallic contact or connection with the tank itself. At the same time heat is applied to the tank, and the temperature of the liquor within raised to any given point desired, the vapor or disengaged gases passing upward through the escape pipe, fig. 12, to the condensing pipe, fig. 8. When the process has been continued for a sufficient length of time the stop-cock in the connecting pipe, fig. 7, is turned, preventing the flow from the pump into the re-supply pipe and directing it into the condensing pipe, fig. 8, and thus the tank is emptied of its contents.

I do not claim to be the first inventor of a new process for rectifying or distilling alcoholic liquors, as I am aware that many inventions for this purpose already exist; neither do I claim to be the inventor of a process by which attrition alone is used, as I am also aware that this has been known and used; but I do claim specifically to be the inventor of a process or method by which, with the aid of heat and electricity, either separately or in combination, I can change, alter, or modify fresh or recently-distilled whiskey, brandy, gin, or any and all other alcoholic liquors, so as to render them essentially the same as if they had lain in casks for years, and thus become modified by age. And I also claim specifically the combination of heat, electricity, and attrition in operating for the purposes just previously set forth; and I do believe, according to my knowledge, that the same has never been known or used before, by any person, for such purposes hereinbefore named.

In my newly invented process there are no chemicals or deleterious substances added to the liquor undergoing modification, as is the case in other processes. The desired results are attained in a much more expeditious manner, and the expense attendant upon machinery and operating is much less than in other processes.

In operating or conducting my process or method I do not confine myself to the exact forms of construction of apparatus as set forth or laid down in the drawings, for it is obvious that the same results may be obtained, analogous though not identical, without changing the principles of application or action.

Having thus described my invention, what I claim, and desire to secure by Letters Patent, is—

1. The process herein described for changing, altering, and modifying whiskey, brandy, gin, or other alcoholic liquor, so as to give them the character and quality of similar liquors as usually acquired by long keeping.

2. The combined action of heat, electricity, and attrition, so as to modify and change alcoholic liquors, substantially as herein described.

3. The combination of an electric battery, pump, and tanks, or their equivalents, so as to treat alcoholic spirits substantially as herein described.

JOS. LLOYD MARTIN.

Witnesses:
R. C. MURRAY,
GEO. FISHER.